(No Model.)

D. C. CAMP.
COOLER AND PURIFIER FOR LIQUIDS.

No. 426,914. Patented Apr. 29, 1890.

Witnesses
Edwin L. Bradford
J. McNamee

Inventor
David C. Camp

UNITED STATES PATENT OFFICE.

DAVID C. CAMP, OF GAINESVILLE, GEORGIA.

COOLER AND PURIFIER FOR LIQUIDS.

SPECIFICATION forming part of Letters Patent No. 426,914, dated April 29, 1890.

Application filed April 4, 1890. Serial No. 346,506. (No model.)

*To all whom it may concern:*

Be it known that I, DAVID C. CAMP, a citizen of the United States, residing at Gainesville, in the county of Hall and State of Georgia, have invented certain new and useful Improvements in Treating Lard; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to lard-coolers, and the object of the invention is to produce a device that will purify the lard and at the same time reduce it to a normal temperature; and the invention consists in the mechanism hereinafter more fully shown, and particularly described in the specification, to which reference may be had for a more thorough understanding of the means by which this end is accomplished.

Figure 1:
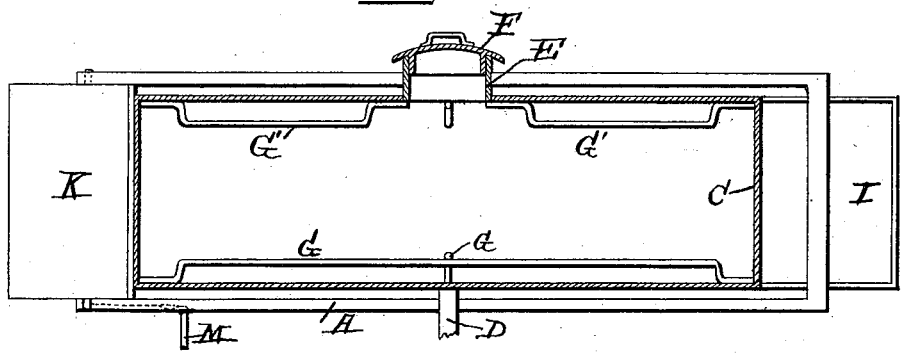
Figure 2:
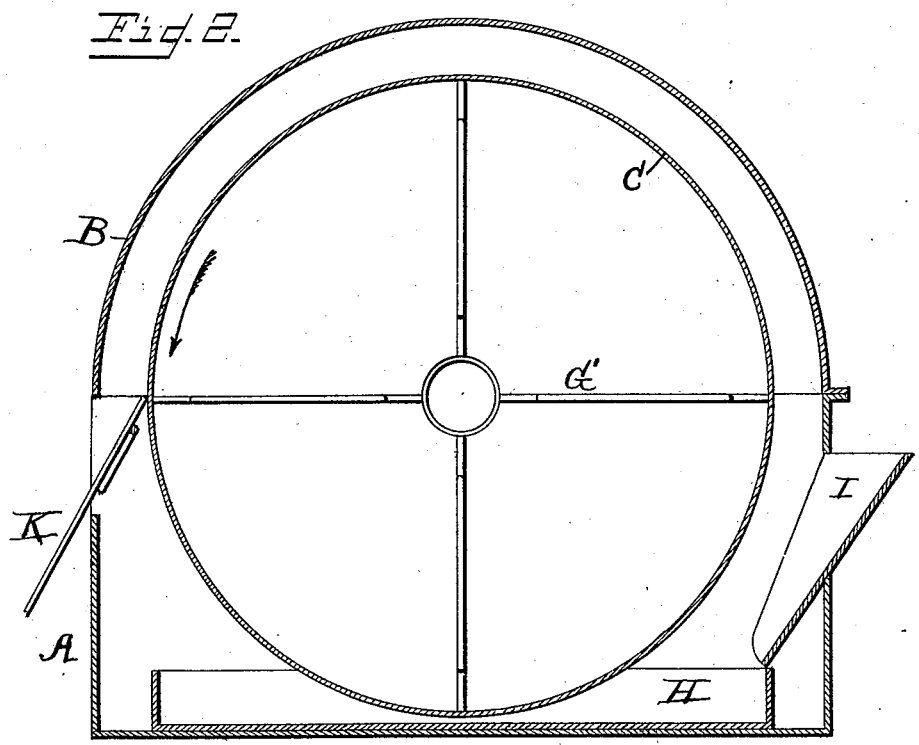
Figure 3:
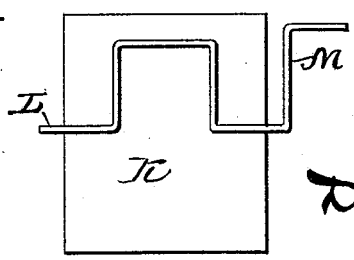

In the drawings, Figure 1 is a longitudinal section of my improved cooler. Fig. 2 is a side elevation of the same, and Fig. 3 is a detail of the scraper and its connected mechanism.

A is an outer shell or casing, which may be of any suitable size or shape and of any suitable material. This casing is provided with a cap or cover B, removable at will.

C is a drum provided with a smooth periphery and mounted upon trunnions D and E. The trunnion D may be provided with a crank or gearing by means of which the drum is revolved. The trunnion E is an enlarged hollow one and is provided with a removable cap or cover F, by means of which access may be had to the interior of the drum.

G and G' are ribs, preferably of wire, the object of which is to keep up an agitation of the contents of the drum while revolving.

H is a removable pan located in the base of the shell A, and I is a hopper or funnel by means of which the liquid to be treated may be poured into the pan H.

K is a scraper, the upper edge of which is beveled and comes in contact with the periphery of the drum C. This scraper K is provided with a peculiarly-shaped shaft L, which is conformed to make journals upon which the scraper is mounted. One extremity of this shaft is provided with a crank M, the handle of which presses against the outside of the casing A and serves to act as a friction-brake, by means of which the scraper is adjusted with reference to said drum.

In operation the cap F is removed and a freezing-mixture—such as ice and salt or other suitable freezing-mixture—is put in the drum and the liquid to be treated is poured in the hopper I to a suitable height in the pan H. The drum is then revolved by means of the shaft D in the direction shown by the arrow. The liquid, which adheres to the periphery of the drum, is frozen in its passage from the pan to the scraper and is removed from the drum by the scraper and falls into any suitable receptacle placed there to receive it.

It will be understood by those familiar with this art that the scraper K can readily be removed from the casing A, in which it is journaled, for the purpose of cleaning or otherwise, and as the scraper requires adjustment this can readily be accomplished by means of the friction-handle M, which holds said scraper in an adjustable position. It is obvious that any liquid may be purified, treated, or manipulated by this machine.

Having thus described my invention, what I claim as new and useful, and desire to secure by Letters Patent of the United States, is—

The casing A, provided with the integral hopper I, removable pan H, and scraper K, having a frictional clamp-handle M, in combination with a rotating drum C, provided with internal ribs G G', substantially as shown and described.

In testimony whereof I affix my signature in presence of two witnesses.

DAVID C. CAMP.

Witnesses:
GIDEON K. LOOKER,
A. G. MCDANIEL.